US012322519B2

(12) United States Patent
Wang et al.

(10) Patent No.: US 12,322,519 B2
(45) Date of Patent: Jun. 3, 2025

(54) SYSTEM AND METHOD FOR LOCAL RESISTIVITY MEASUREMENT AND CRITICAL HEAT FLUX CALCULATION FOR NUCLEAR REACTOR CLADDING TUBING

(71) Applicant: Westinghouse Electric Company LLC, Cranberry Township, PA (US)

(72) Inventors: Guoqiang Wang, Murrysville, PA (US); William A. Byers, Murrysville, PA (US); Stephen J. Harding, Leechburg, PA (US); Kevin A. Harding, Saxonburg, PA (US)

(73) Assignee: Westinghouse Electric Company LLC, Cranberry Township, PA (US)

( * ) Notice: Subject to any disclaimer, the term of this patent is extended or adjusted under 35 U.S.C. 154(b) by 0 days.

(21) Appl. No.: 17/454,374

(22) Filed: Nov. 10, 2021

(65) Prior Publication Data
US 2022/0148747 A1 May 12, 2022

Related U.S. Application Data

(60) Provisional application No. 63/112,719, filed on Nov. 12, 2020.

(51) Int. Cl.
*G21C 17/10* (2006.01)
*G21C 3/06* (2006.01)
(52) U.S. Cl.
CPC .............. *G21C 17/10* (2013.01); *G21C 3/06* (2013.01)

(58) Field of Classification Search
CPC ...... G21C 17/017; G21C 17/06; G21C 17/10; G01R 1/07307; G01R 27/08; G01N 27/04
(Continued)

(56) References Cited

U.S. PATENT DOCUMENTS 3,721,897 A * 3/1973 Edling ...................... G01B 7/06
324/703
4,989,154 A * 1/1991 Yamashita ............. G01R 27/14
702/65

(Continued)

OTHER PUBLICATIONS

Wang, G., et al. "Thermal conductivity measurements for simulated PWR crud." International Conference on Nuclear Engineering. vol. 55782. American Society of Mechanical Engineers, 2013. (Year: 2013).*

(Continued)

*Primary Examiner* — Jack W Keith
*Assistant Examiner* — Jinney Kil
(74) *Attorney, Agent, or Firm* — K&L Gates LLP (57) ABSTRACT

Disclosed are a voltage drop measurement system and methods for measuring resistivity of a nuclear reactor cladding. The system includes a short cladding sample of a nuclear reactor cladding. Two electrically conductive plugs are attached to the short cladding. A power supply is electrically coupled to the each of the two electrically conductive plugs and is configured to apply an electrical current to the short cladding through the two electrically conductive plugs. Two needle like probes are electrically coupled to a surface of the short cladding between the two electrically conductive plugs. The needle like probes are spaced apart by a distance L. Resistivity and heat flux are determined in accordance with Equations (1)-(4).

14 Claims, 9 Drawing Sheets

(58) Field of Classification Search
USPC ............. 324/713, 715; 374/29; 376/245–259
See application file for complete search history.

(56) References Cited

U.S. PATENT DOCUMENTS

| | | | | |
|---|---|---|---|---|
| 5,225,148 | A * | 7/1993 | Desruelles | G01B 17/025 |
| | | | | 73/620 |
| 7,157,920 | B2 * | 1/2007 | Barber | G01N 27/20 |
| | | | | 324/718 |
| 8,466,687 | B2 * | 6/2013 | Reed | G01N 27/61 |
| | | | | 324/454 |
| 2013/0156142 | A1 * | 6/2013 | Yodo | G21C 17/00 |
| | | | | 376/244 |
| 2017/0358374 | A1 * | 12/2017 | Loewen | G21C 17/032 |

OTHER PUBLICATIONS

Lee, Soon K., et al. "Comparison of steady and transient flow boiling critical heat flux for FeCrAl accident tolerant fuel cladding alloy, Zircaloy, and Inconel." International Journal of Heat and Mass Transfer 132 (2019): 643-654. (Year: 2019).*

Wang, G., et al. "Westinghouse advanced loop tester (WALT) update." International Conference on Nuclear Engineering. vol. 48167. 2008. (Year: 2008).*

* cited by examiner

SYSTEM AND METHOD FOR LOCAL RESISTIVITY MEASUREMENT AND CRITICAL HEAT FLUX CALCULATION FOR NUCLEAR REACTOR CLADDING TUBING

CROSS-REFERENCE TO RELATED APPLICATIONS

This application claims the benefit of priority under 35 U.S.C. § 119(e) to U.S. Provisional Patent Application Ser. No. 63/112,719, titled SYSTEM AND METHOD FOR LOCAL RESISTIVITY MEASUREMENT AND CRITICAL HEAT FLUX CALCULATION FOR NUCLEAR REACTOR CLADDING TUBING, filed Nov. 12, 2020, the disclosure of which is herein incorporated by reference in its entirety.

BACKGROUND

In a nuclear reactor, nuclear fuel in the form of cylindrical pellets are stacked and filled into thin-walled metal tubes. The metal used for the tubes depends on the design of the reactor. Although stainless steel has been used in the past, most reactors now use a zirconium alloy which, in addition to being highly corrosion-resistant, has low neutron absorption. The tubes containing the fuel pellets are sealed and are called fuel rods. The finished fuel rods are grouped into fuel assemblies that are used to build up the core of a nuclear reactor.

Cladding is an outer layer of the fuel rods, standing between the coolant and the nuclear fuel pellets. Cladding is made of a corrosion-resistant material with low absorption cross section for thermal neutrons, usually a zirconium (Zr)-alloy or steel in modern reactors. Cladding prevents radioactive fission fragments from escaping the fuel into the coolant and contaminating it. The cladding prevents corrosion of the nuclear fuel by the coolant and the release of fission products into the coolant. The cladding may be made of corrosion-resistant materials such as zirconium alloys, which may or not be coated with chromium. The corrosion-resistant materials generally have a low absorption cross section for thermal neutrons (~0.18×10$^{-24}$ cm$^2$) usually zirconium alloy with or without chromium. Since cladding constitutes one of the barriers in a 'defense-in-depth' approach to designing and operating nuclear facilities that prevents and mitigates accidents that release radiation or hazardous materials, the coolability of nuclear fuel rod with cladding is one of the safety aspects.

The present disclosure is generally directed to a system and method for measuring local resistivity and calculating critical heat flux (CHF) of a nuclear fuel rod cladding. More particularly, the present disclosure is directed to a system and method for measuring local resistivity and calculating CHF of a nuclear fuel rod with a Zr-alloy fuel cladding with or without a chromium (Cr) coating.

SUMMARY

In one aspect, the present disclosure provides a system and method for measuring local resistivity and calculating critical heat flux as shown and described in connection with FIGS. 2-6 as well as Equation (4).

Figure 2:
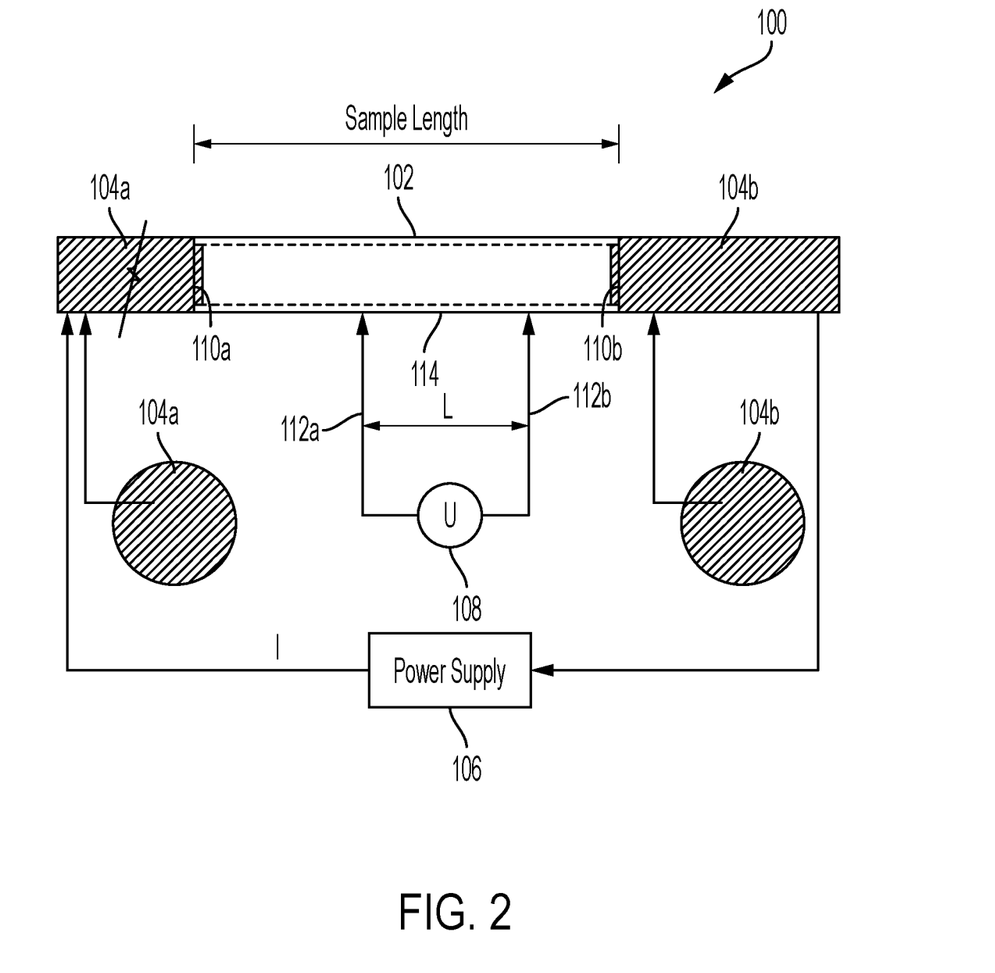
FIG. 2 illustrates a voltage drop measurement system at four quadrants of a short nuclear reactor cladding, in accordance with at least one aspect of the present disclosure.

In another aspect of the present disclosure, the setup shown in FIG. 2 includes needle like probes 112a, 112b, for local resistivity measurement.

In another aspect of the present disclosure, the nuclear fuel rod plug 104a, 104b connection to the cladding 102 in the DNB test section is simulated in detail.

Figure 6:
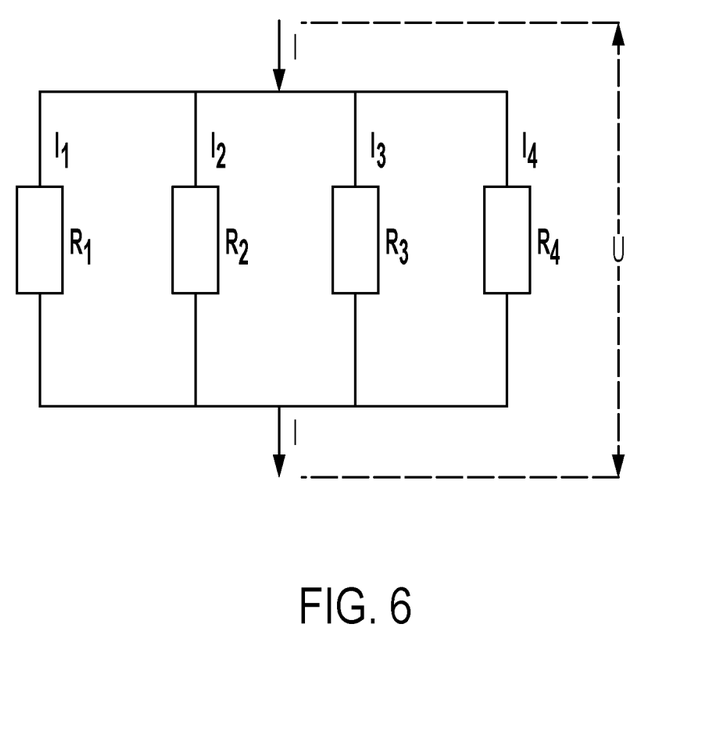
FIG. 6 illustrates an equivalent circuit of the four parallel equivalent resistors $R_1$, $R_2$, $R_3$, $R_4$ of the four segments of the short nuclear reactor cladding shown in FIG. 5, in accordance with at least one aspect of the present disclosure.

In another aspect of the present disclosure, with the plugs 104a, 104b connected to the cladding 102, four quadrants have the same voltage at each end of the selected short cladding 102 as shown in FIG. 6.

In another aspect of the present disclosure, the calculation method in Equation (4) is employed for the local critical heat flux calculations.

In another aspect of the present disclosure, the local segment/quadrant with a lower resistance will have higher heat flux.

In another aspect of the present disclosure, consistent with the system and method, four thermocouples can be placed against the inner surface of the cladding in a real DNB heater rod buildup.

In another aspect of the present disclosure, at least one of the thermocouples will measure the segment or quadrant with higher heat flux.

In another aspect of the present disclosure, the four quadrant system and method for local resistivity measurement and local heat flux calculation will help to calculate the local heat flux more accurately.

In another aspect of the present disclosure, the uncertainty for the CHF value is reduced.

In another aspect of the present disclosure, the system and method according to the present disclosure can be utilized in the heat flux calculations for DNB tests with direct heating.

Further, it is understood that any one or more of the following-described forms, expressions of forms, examples, can be combined with any one or more of the other following-described forms, expressions of forms, and examples.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

Various features of the embodiments described herein, together with advantages thereof, may be understood in accordance with the following description taken in conjunction with the accompanying drawings as follows.

Corresponding reference characters indicate corresponding parts throughout the several views. The exemplifications set out herein illustrate various embodiments of the invention, in one form, and such exemplifications are not to be construed as limiting the scope of the invention in any manner.

DETAILED DESCRIPTION

In one aspect, the present disclosure provides a system and method for measuring the local resistivity and calculating the critical heat flux (CHF) of the cladding on the outer layer of the fuel rods. The system and method according to the present disclosure provides accurate CHF result values and is a departure from nucleate boiling (DNB) type test with direct heating. The resistance or resistivity for a Zr-alloy fuel cladding, provided by the applicant and known in the industry under the tradename ZIRLO™ or Optimized ZIRLO™, with or without a Cr coating layer, will vary at different axial or circumferential locations.

To reduce uncertainties, the system and method according to the present disclosure provides a more detailed and accurate measurement of the local resistivity of the fuel cladding. Nuclear fuel rods comprising a Cr layer applied on a base Zr-alloy cladding, such as ZIRLO™ or Optimized ZIRLO™ cladding, may be employed in accident tolerant nuclear fuel products provided by the applicant and known in the industry under the tradename EnCore®. In current DNB tests, such as the Westinghouse Advanced Loop Test (WALT), a CHF calculation utilizes averaged resistivity or voltage measurements. A comparison of traditional averaged and the local resistivity measurements obtained according to the present disclosure shows that the resistivity of a local segment or quadrant of a fuel rod with cladding can vary up to several percent, which can affect the accuracy of the CHF calculation. Accordingly, the calculated CHF uncertainty for using a tradition average resistivity measurement is relatively high.

The local resistivity measurement of the cladding according to the present disclosure provides an accurate calculation of the local heat flux, especially for a Cr-coated cladding applied using a cold spray method disclosed in commonly owned International Application Number PCT/US20/56420, titled MULTIPLE NOZZLE DESIGN IN A COLD SPRAY SYSTEM ASSOCIATED METHOD, FILED Oct. 20, 2020, which is incorporated herein by reference in its entirety. High-velocity thermal application methods are disclosed in commonly owned U.S. Pat. No. 10,290,383, titled DEPOSITION OF INTEGRATED PROTECTIVE MATERIAL INTO ZIRCONIUM CLADDING FOR NUCLEAR REACTORS BY HIGH-VELOCITY THERMAL APPLICATION, issued May 14, 2019, which also is incorporated herein by reference in its entirety. The present disclosure provides a system and method for measuring local resistivity and calculating heat flux.

Figure 1:
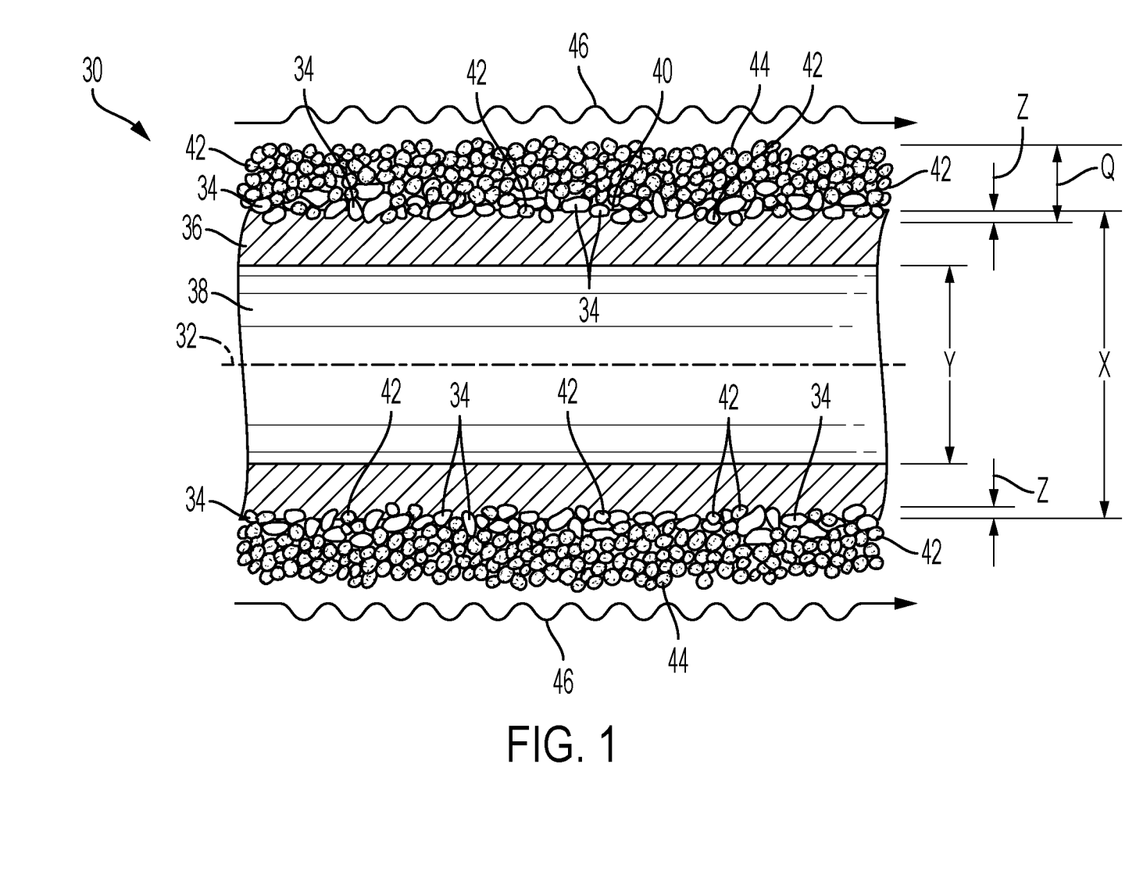
FIG. 1 illustrates a schematic of a cylindrical zirconium alloy nuclear reactor cladding.

By way of background, FIG. 1 illustrates a schematic of a cylindrical zirconium alloy nuclear reactor cladding. The cylindrical zirconium alloy nuclear reactor cladding 30 is a thin-walled metal tube that forms the outer jacket of a nuclear fuel rod to prevent corrosion of the fuel by the coolant and the release of fission products into the coolant. The cylindrical zirconium alloy nuclear reactor cladding 30 has an axis 32 in a normal environment of $H_2O$ during operation or, normal ambient air, where invariably an oxide coating 34 grows, in this case $ZrO_2$ since the cladding 30 is made of greater than 95% Zr alloy 36. The cylinder bore is shown as 38. The oxide coating/layer 34 is generally 10 nanometers thick, which translates to several atomic layers of $ZrO_2$ if only exposed to air and is comprised of a reasonably tight but still porous $ZrO_2$ coating adhering to the top surface 40 of the cladding before use.

The particle size of the protective material should be relatively large to create massive impact and substantial cratering of the Zr alloy 36 but small enough to allow particle to particle interactions to form a tight, impermeable layer. The particle size is generally from 1 micrometers to 500 micrometers, preferably from 10 micrometers to 100 micrometers. Under 1 micrometers, the impact effect will be less effective leading to excessive particle loss and insufficient penetration.

The protective particles can be either $Ti_xAl_yC_z$ ceramic where x=2 to 4; y=1 to 1 and z=1 to 3; or iron-based alloy $Fe_xAl_yCr_z(G)$ where x=0 to 70, y=0 to 30, and z=0 to 30 and (G) is comprised of any number of minor constituents that may include the elements Ni, Si, Mn, Mo, P, S, Co, W, B, or C. The protective particles can also be Nanosteel® which has the composition: material chemistry (wt %); Cr<25%; W<15%; Nb<12%; Mo<6%; B<5%; C<4%; Mn<3%; Si<2%; and Fe balance. Additionally, the deposited particles could have a formulation that is comprised of a Zr—Al alloy, where Al may comprise up to 99.9 atom % of the alloy. However, the preferred protective particles are Ti—Al—C, and the most preferred formulation is $Ti_2AlC$. $Ti_2AlC$ is preferred because it is corrosion resistant to >1,250° C. These integrated protective layers also serve to improve the fuel reliability and the fuel cycle economics because they are hard and resist wear. In addition, these layers have a very high temperature capability that enables better corrosion resistance, and consequently are more accident-tolerant at high temperature accident conditions.

The hybrid thermal-kinetic deposited protective gradient nuclear reactor cladding comprises a protective material 42 that permeates/infiltrates as an integrated gradient network. As can be seen, the protective material 42 has penetrated the oxide coating 34 shown in disarray and intermixed with the protective material in an intermediate portion Z, where X is the total diameter of the nuclear reactor cladding 30, while Y is the diameter of the cylindrical bore 38 and Q is the outer portion mixture of $ZrO_2$ and protective material with the highest density of protective material being at the final exterior 44 of the nuclear reactor cladding. Reactor coolant water is shown by arrow 46. As a means of judging distances, if X−Y=1,000 units; 2Z=1 to 10 units=impregnation; and Q=100 to 600 units of outer particles+oxide+Zr alloy.

FIG. 2 illustrates a voltage drop measurement system 100 at four quadrants of a short nuclear reactor cladding 102 of a nuclear reactor cladding, in accordance with at least one aspect of the present disclosure. The short nuclear reactor cladding 102 is a small piece or sample cut from a full length nuclear reactor cladding. The voltage drop measurement system 100 comprises multiple segments cut from the short cladding 102, two electrically conductive plugs 104a, 104b, a power supply 106, and a voltmeter 108. The voltage drop measurement system 100 employs a four quadrant method to measure the local resistivity of the short cladding 102. The plugs 104a, 104b are electrically attached on respective ends 110a, 110b of the cladding 102. In one aspect, the plugs 104a, 104b may be laser welded to the ends 110a, 110b of the cladding 102 to better simulate a nuclear fuel rod connection in a DNB test section.

In one aspect, the cladding 102 is divided into four quadrants. Electrical current (I) is applied to the first plug 104a and is passed through the cladding 102 and the second plug 104b. In one aspect the current (I) may be 4 A. A voltage (V) induce on the cladding 102 is picked up by two needle like probes 112a, 112b, or clips, electrically coupled to the outer surface 114 of the cladding 102 and the voltage is recorded by the voltmeter 108. The resistivity measurement is repeated in each of the four quadrants by rotating the cladding 102 by 90° after each measurement is made until resistivity measurements are made in all four quadrants. In various aspects, the cladding 102 may be divided in more than four quadrants. For example, the cladding 102 may be divided into n circumferential sections (n-tants) and rotating the cladding 102 by 360°/n after each resistivity measurement until all n measurements are made.

Figure 3:
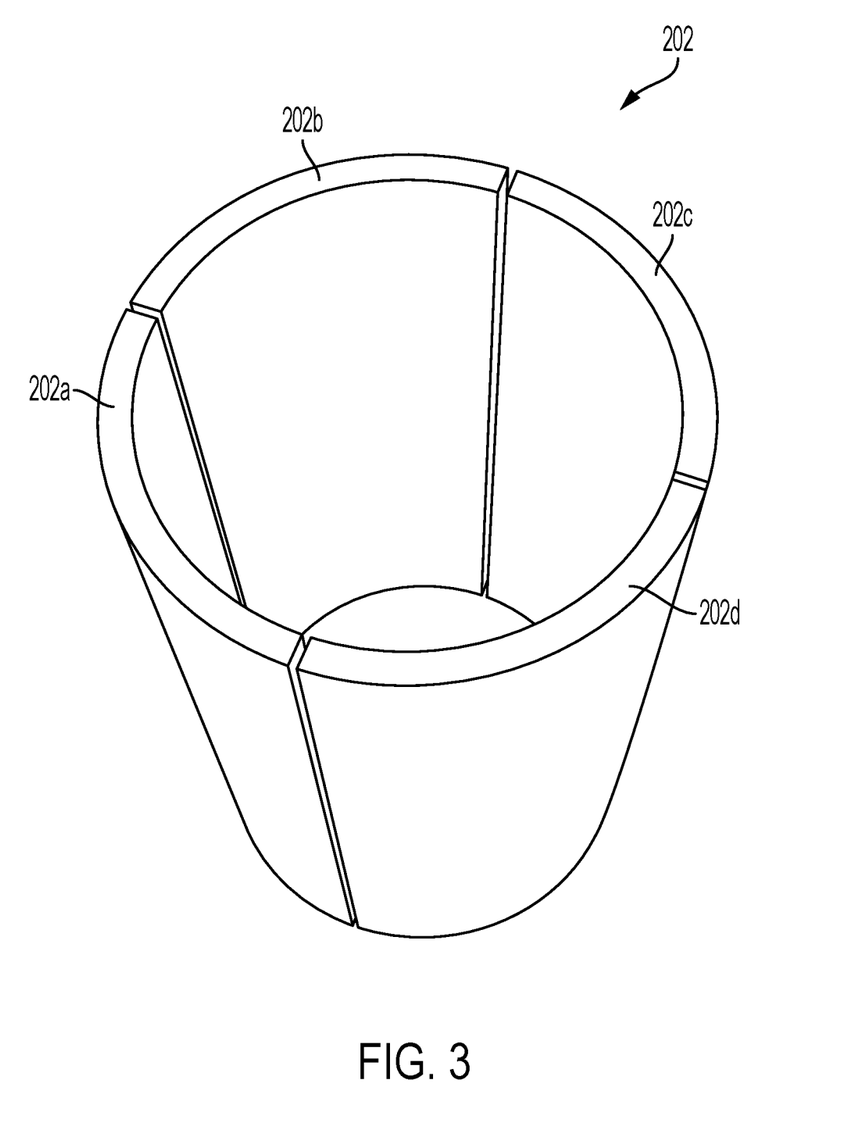
FIG. 3 illustrates a short nuclear reactor cladding divided into four longitudinal segments, in accordance with at least one aspect of the present disclosure.

FIG. 3 illustrates a short nuclear reactor cladding 202 divided into four longitudinal segments 202a, 202b, 202c, 202d, in accordance with at least one aspect of the present disclosure. In various aspects, the short cladding 202 may be divided into n longitudinal segments (202n), for example. The voltage drop measurement system 100 shown in FIG. 2 may be adapted and configured to measure the resistivity of each longitudinal segment 202a-202d of the short cladding 202.

Using the different methods shown in FIG. 2 (i.e., the four quadrant method) and FIG. 3 (i.e., the four segment method), local or equivalent local resistivities of the short cladding 102 can be measured. Preliminary results show that both the four quadrant and the four segment methods provide very similar local resistivity variations. The four quadrant method shown in FIG. 2 is more practical in DNB test applications and more focused in the following discussions.

With reference now to FIG. 2, the span length L of the two needle like probes 112a, 112b is measured carefully. The voltage drop (U) and the current (I) across this span length L are also measured. The sample length of the cladding 102 is also measured. The cross sectional area (S) of the short cladding 102 can be easily calculated from the sample length of the short cladding 102. Using Ohm's law and the definition of resistivity, the local resistivity of the short cladding 102 can be calculated in accordance with Equation (1):

$$\rho = \frac{U}{I} \times \frac{S}{l} \quad (1)$$

Equation (1) can be applied to the four quadrants of the short cladding 102 described in connection with FIG. 2 or the four longitudinal segments 202a-202d of the short cladding 202 described in connection with FIG. 3.

Figure 4:
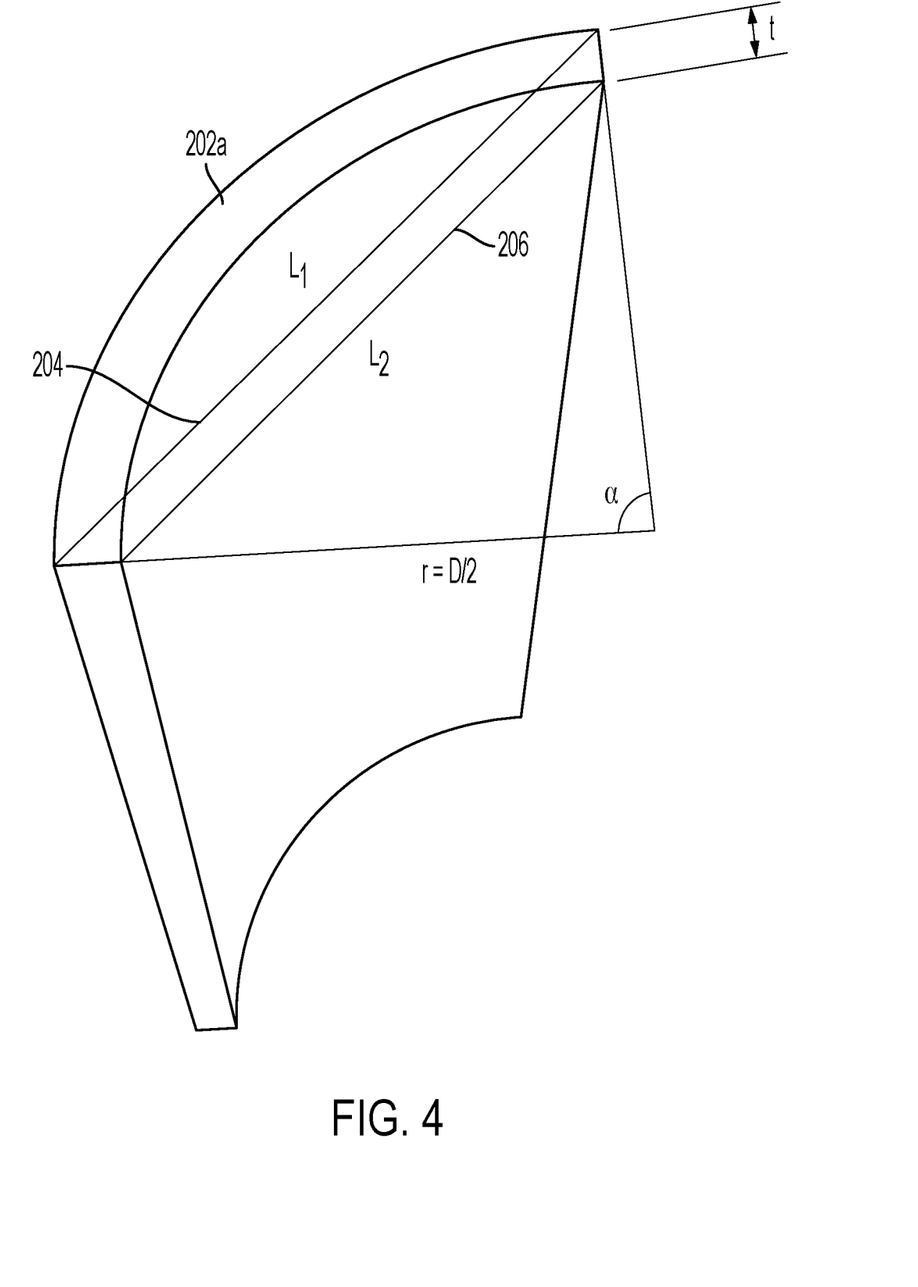
FIG. 4 illustrates one of the segments of the short nuclear reactor cladding shown in FIG. 3, in accordance with at least one aspect of the present disclosure.

FIG. 4 illustrates one of the segments 202a of the short cladding 202 shown in FIG. 3. With reference now to FIGS. 3 and 4, two triangles 204, 206 may be defined by the segment 202a. The triangle 204 has $L_1$ as the base and the radius (r) plus the thickness (t) of the cladding 202 as the laterals. The second triangle 206 has $L_2$ as the base and (r) as the laterals. In each triangle 204, 206, L may represent either $L_1$ or $L_2$. Thus, the center angle (a) can be calculated using the law of cosines in accordance with Equation (2):

$$\alpha = 2\arcsin\left(\frac{L}{2r}\right) = 2\arcsin\left(\frac{L_1}{OD}\right) = 2\arcsin\left(\frac{L_2}{ID}\right) \quad (2)$$

After calculating α, the cross section area of the segment 202a can be calculated in accordance with Equation (3):

$$S = \frac{\alpha}{360} \times \left(\pi \times \frac{OD^2 - ID^2}{4}\right) \quad (3)$$

After getting the directly measured values for voltage drop (U), current (I), and the length (L) of a segment or quadrant of a selected cladding, the local electrical resistivity can be calculated using Equation (1). After the measurement for one quadrant, the short cladding 102 was rotated by 90° to measure the next quadrant, etc. The advantage of the four quadrant method is that the plug 104a, 104b connections in the DNB test section was simulated in detail during the resistivity measurement process, and the local resistivity was measured in detail, allowing for detection of resistivity changes caused by the local thickness and/or chromium coating thickness variation of the short cladding 102.

There are different resistivity values measured for the four different segments 202a-202d or quadrants from a single piece or the whole nuclear fuel rod cladding 102 with welded plugs 104a, 104b, respectively. At high temperature (e.g. >425° C.), the resistivity values vary by several percent. This is a factor to be considered for the accuracy of the CHF calculations in the data processing.

Figure 5:
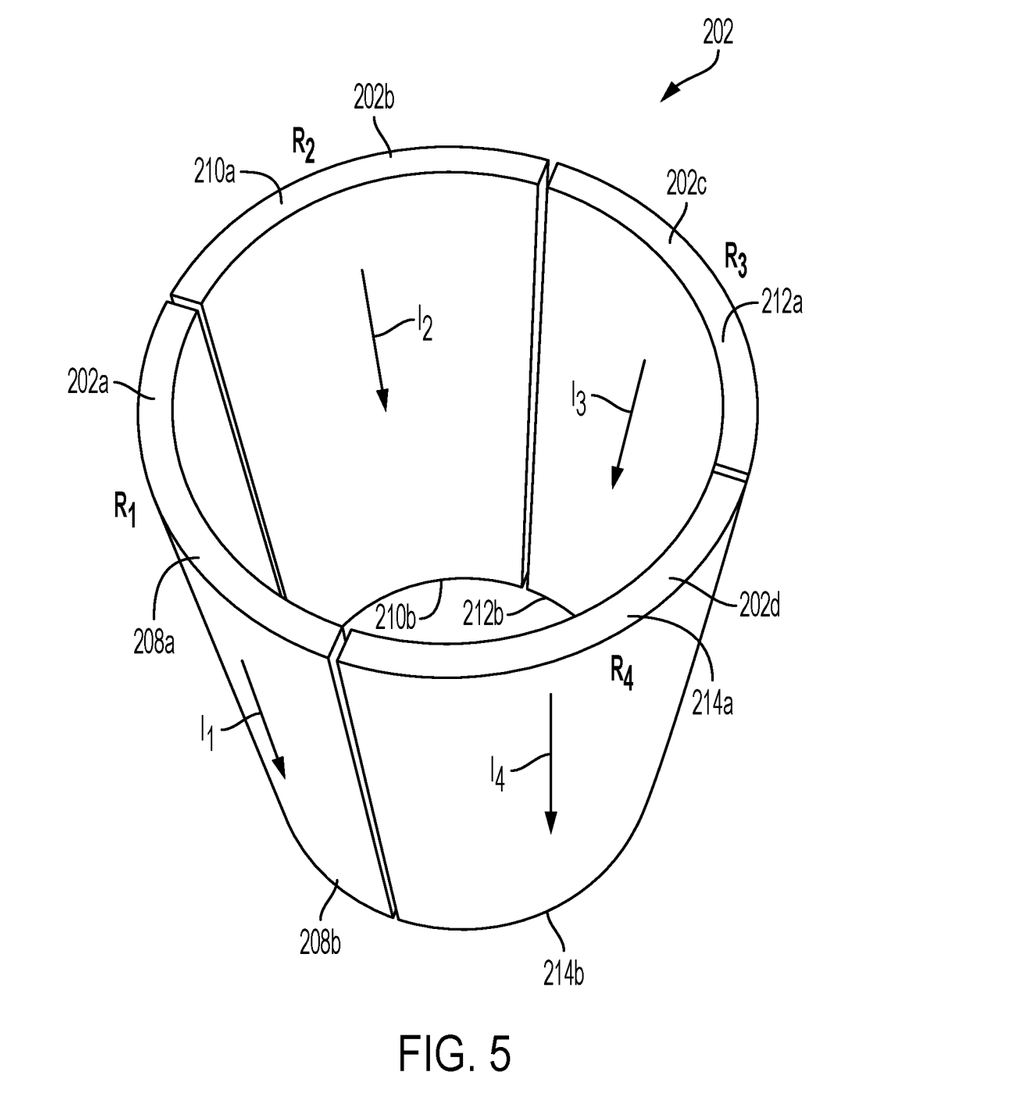
FIG. 5 shows that the four segments in the short nuclear reactor cladding can be illustrated as four parallel equivalent resistors $R_1$, $R_2$, $R_3$, $R_4$, in accordance with at least one aspect of the present disclosure.

Meanwhile, since the fuel rod plug 104a, 104b connection in the DNB test section to the cladding 102 was simulated in detail, it is reasonable to assume that the four segments 202a-202d or quadrants have the same voltage at each end of the selected short tube. For example, FIG. 5 shows that the four segments 202a-202d in the short cladding 202 can be illustrated as four parallel equivalent resistors $R_1$, $R_2$, $R_3$, $R_4$ (FIG. 6). A constant voltage (U) is applied between top and bottom ends 208a/208b, 210a/210b, 212a/212b, 214a/214b. A current $I_1$ will flow between the top end 208a of the segment 202a and the bottom end 208b of the segment 202a through $R_1$ and is measured by a current meter. A current $I_2$ will flow between the top end 210a of the segment 202b and the bottom end 210b of the segment 202b through $R_2$ and is measured by a current meter. A current $I_3$ will flow between the top end 212a of the segment 202c and the bottom end 212b of the segment 202c through $R_3$ and is measured by a current meter. A current $I_4$ will flow between the top end 214a of the segment 202d and the bottom end 214b of the segment 202d through $R_4$ and is measured by a current meter. The voltage will be measured as shown in FIG. 2. The voltage will be measured through a pair of needle like probes 112a, 112b as shown in FIG. 2. In direct current resistive conductor, the local instantaneous electrical power ($P_i$) is calculated using Joule's Law combined with Ohm's law. Then, the local heat flux ($q_i''$) generated through each of the cladding segments 202a-202d by electrical current is calculated in accordance with Equation (4):

$$q_i'' = \frac{P_i}{S_i} = \frac{I^2 \times \frac{1}{\rho_i \frac{1}{S_i}}}{\alpha_i \times r_1 \times l \times \left(\frac{1}{\rho_1 \frac{1}{S_1}} + \frac{1}{\rho_2 \frac{1}{S_2}} + \frac{1}{\rho_3 \frac{1}{S_3}} + \frac{1}{\rho_4 \frac{1}{S_4}}\right)^2} = \quad (4)$$

$$\frac{I^2 \times \frac{S_i}{\rho_i}}{\alpha_i \times r_1 \times \left(\frac{S_1}{\rho_1} + \frac{S_2}{\rho_2} + \frac{S_3}{\rho_3} + \frac{S_4}{\rho_4}\right)^2}$$

Where, $q_i''$ (i=1,2,3,4) is the local heat flux, W/cm$^2$;

I is the total DC current recorded in the WALT data acquisition system, amps;

$P_i$ (i=1,2,3,4) is the local instantaneous electrical power, W;

$\alpha_i$ is the central angle of a segment/quadrant, radian. For a perfect quadrant, $\alpha_i=\pi/2$;

l is the segment/quadrant length, cm;

$r_1$ is the outer radius of the cladding, cm;

$\rho_i=\rho_1$, $\rho_2$, $\rho_3$, or $\rho_4$, which are measured local resistivity of a segment/quadrant, ohm-cm;

$S_i=S_1$, $S_2$, $S_3$, and $S_4$, which are cross sectional area of a segment/quadrant, cm$^2$.

From Equation (4), the local heat flux ($q_i''$) is calculated and utilized in the four quadrant method in the DNB test data reduction. It is notable that the local power varies due to the different local resistance. A local segment/quadrant with a lower resistance will have higher heat flux. Accordingly, four thermocouples can be placed against the inner surface of the cladding 202. At least one of the thermocouples will measure the segment 202a-202d or quadrant with higher heat flux. It does not matter which thermocouple will measure which segment 202a-202d or quadrant, as long as at least one of the thermocouples can measure the cladding temperature jump during a DNB test.

In summary, the four quadrant system and method for local resistivity measurement and local heat flux calculation can be utilized for DNB test data reduction, as this system and method will facilitate calculating the local heat flux more accurately and thereby reducing the uncertainty of the CHF value. The system and method according to the present disclosure can be utilized in the heat flux calculations for DNB tests with direct heating.

Figure 7:
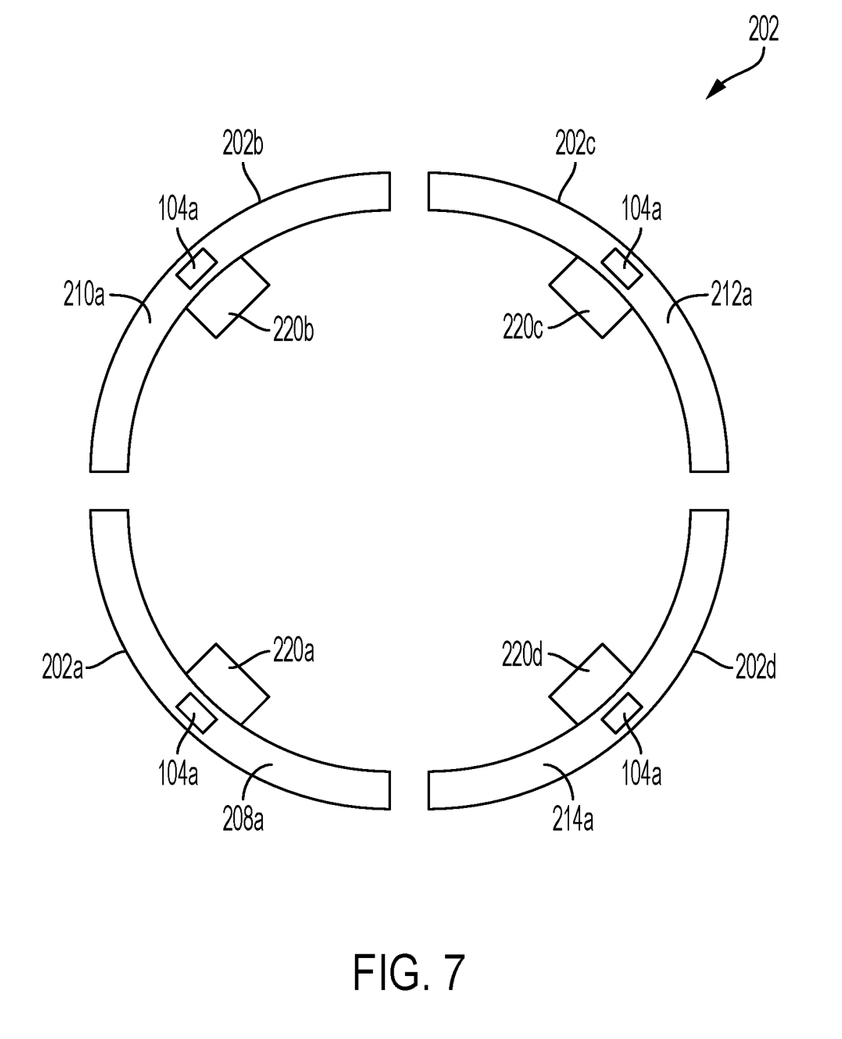
FIG. 7 is an end view of the short nuclear reactor cladding shown in FIGS. 3-5 with thermocouples attached to the interior wall of each segment and electrically conductive plugs attached at each end of each segment, in accordance with at least one aspect of the present disclosure.

FIG. 7 is an end view of the short nuclear reactor cladding 202 shown in FIGS. 3-5 with thermocouples 220a, 220b, 220c, 220d attached to the interior wall of each segment 202a, 202b, 202c, 202d and electrically conductive plugs 104a attached at each end 208a, 210a, 212a, 214a of each segment 202a, 202b, 202c, 202d, in accordance with at least one aspect of the present disclosure. In one aspect of the present disclosure, consistent with the system and method, four thermocouples 220a-220d can be placed against the inner surface of the short cladding 202 segments 202a-202d in a real DNB nuclear fuels rod buildup. In another aspect of the present disclosure, at least one of the thermocouples 220a-220d will measure the segment 202a-202d or quadrant with higher heat flux.

Figure 8:
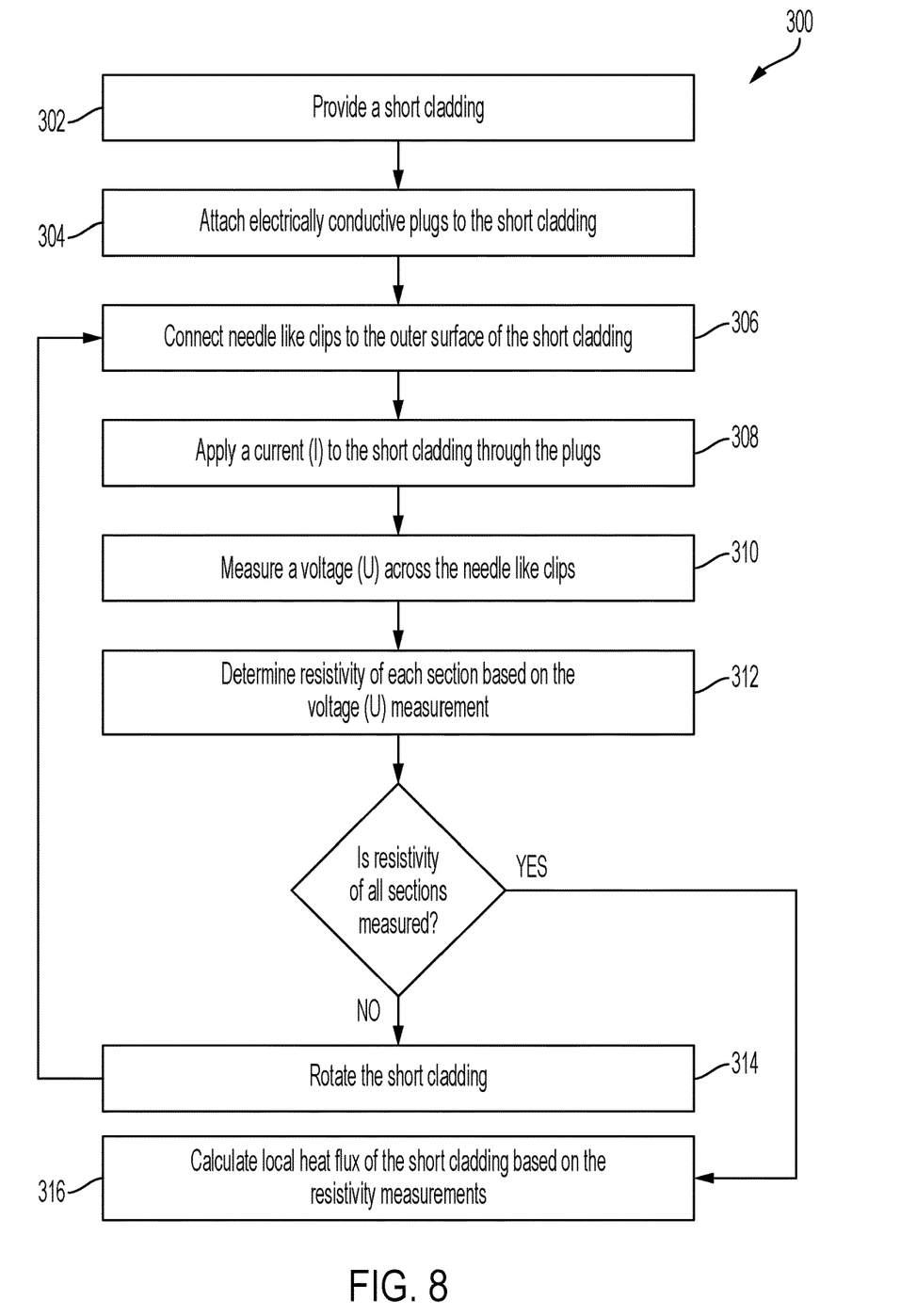
FIG. 8 illustrates a method of measuring local resistivity and calculating heat flux for nuclear cladding tubing, in accordance with at least one aspect of the present disclosure.

FIG. 8 illustrates a method 300 of measuring local resistivity and calculating heat flux for nuclear cladding tubing, in accordance with at least one aspect of the present disclosure. The method 300 comprises providing 302 a short cladding 102. Attaching 304 electrically conductive plugs 104a, 104b to the short cladding 102. Connecting 306 needle like probes 112a, 112b to the outer surface 114 of the short cladding 102, where the distance between the needle like probes 112a, 112b is L. Applying 308 a current (I) to the short cladding 102 through the plugs 104a, 104b and measuring 310 a voltage (U) across the needle like probes 112a, 112b. Determining 312 the resistivity of each section based on the voltage measurements. Rotating 314 the short cladding 102 and repeating processes 306-312. Where the method 300 is a four quadrant method, the short cladding 102 is rotated 90° after each measurement 310 until all four resistivity measurements are determined 312. In other aspects, the short cladding 102 may be divided into n circumferential sections (n-tants) and the cladding 102 is rotated by 360°/n after each resistivity measurement 310 until all n resistivity measurements are made.

In one aspect, the resistivity of each section of the short cladding 102 may be determined in accordance with Equation (1) where U is the measured voltage between the needle like probes 112a, 112b, I is the applied current, L is the distance between the needle like probes 112a, 112b, and S is the cross-sectional of one quadrant of the short cladding 102 and may be calculated according to Equations (2) and (3). The method 300 further comprises calculating 316 local heat flux of the short cladding 102 based on the resistivity measurements. In one aspect, the local heat flux may be calculated 316 in accordance with Equation (4).

Figure 9:
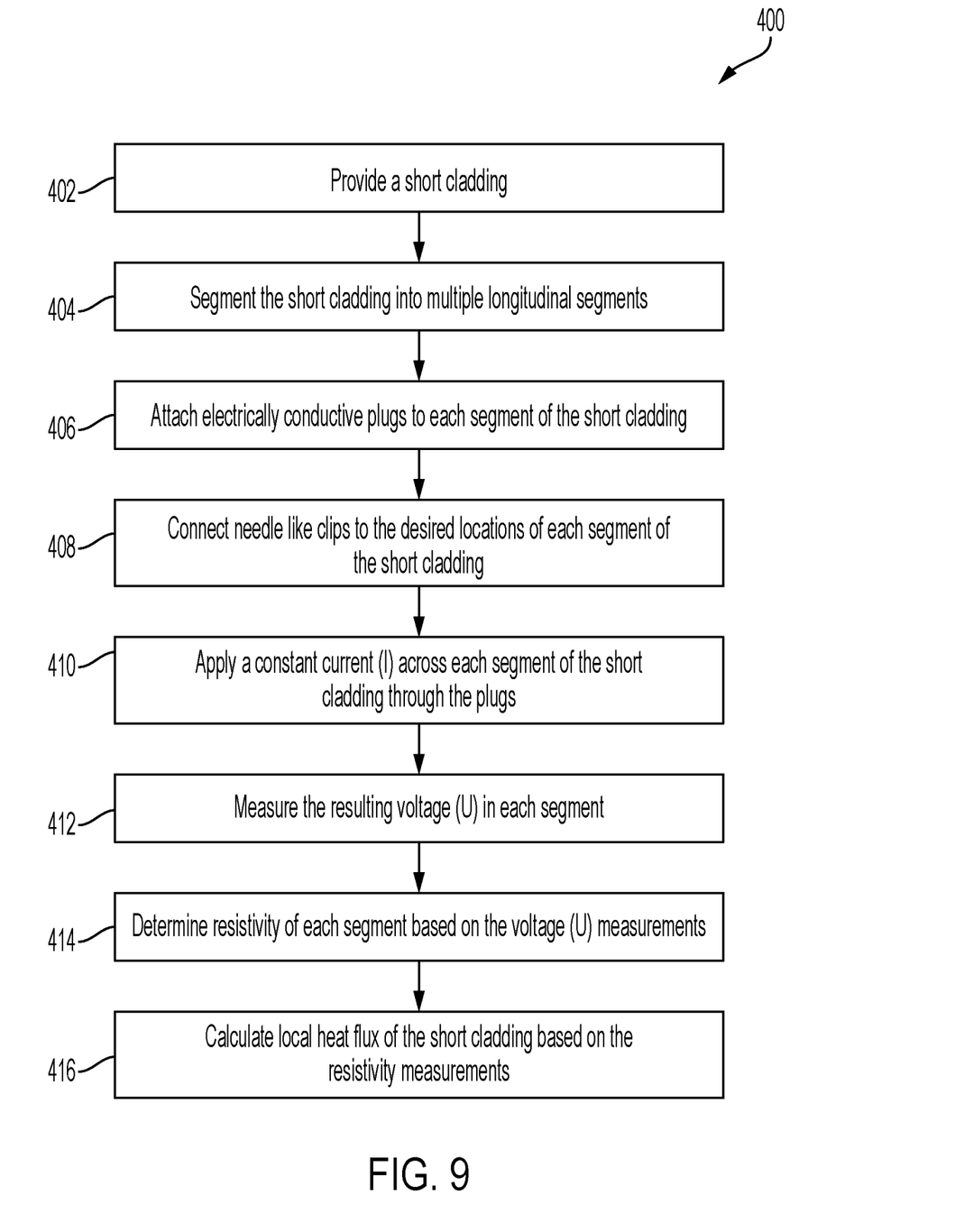
FIG. 9 illustrates a method of measuring local resistivity and calculating heat flux for nuclear cladding tubing, in accordance with at least one aspect of the present disclosure.

FIG. 9 illustrates a method 400 of measuring local resistivity and calculating heat flux for nuclear cladding tubing, in accordance with at least one aspect of the present disclosure. The method 400 comprises providing 402 a short cladding 102. Segmenting 404 the short cladding 102 into multiple longitudinal segments 202a-202d. Attaching 406 electrically conductive plugs 104a, 104b to each segment 202a-202d of the short cladding 102. Connecting 408 needle like probes 112a, 112b to the desired locations of each segment 202a-202d of the short cladding 102. Applying 410 a constant current ($I_1$, $I_2$, $I_3$, $I_4$) across each segment 202a-202d of the short cladding 102 through the plugs 104a, 104b and measuring 412 the voltage (U) in each segment 202a-202d. Determining 414 resistivity of each segment 202a-202d based on the voltage measurement.

In one aspect, the resistivity of each segment 202a-202d may be determined 414 in accordance with Equation (1), where U is the measured voltage, I is the applied current, L is the distance between the needle like probes 112a, 112b, and S is the cross sectional area of the segment 202a-202d of the short cladding 202 and may be calculated in accordance with Equations (2) and (3). The method 400 further comprises calculating 416 local heat flux of the short cladding 202 in accordance with Equation (4).

EXAMPLES

Various aspects of the subject matter described herein are set out in the following examples.

Example 1. A voltage drop measurement system for measuring resistivity of a nuclear reactor cladding, the system comprising: a short cladding sample of a nuclear reactor cladding; two electrically conductive plugs attached to the short cladding; a power supply electrically coupled to the each of the two electrically conductive plugs and configured to apply an electrical current to the short cladding through the two electrically conductive plugs; and two needle like probes electrically coupled to a surface of the short cladding between the two electrically conductive plugs, wherein the two needle like probes are spaced apart by a distance L.

Example 2. The voltage drop measurement system of Example 1, wherein the short cladding is divided into multiple sections and a resistivity measurement is made in each section by rotating the short cladding after each resistivity measurement is made.

Example 3. The voltage drop measurement system of Example 2, wherein the short cladding is divided into four quadrants and a resistivity measurement is made in each quadrant by rotating the short cladding by 90° after each resistivity measurement is made.

Example 4. The voltage drop measurement system of any one or more of Examples 1 through 3, comprising a thermocouple attached to an interior surface of the short cladding.

Example 5. The voltage drop measurement system of any one or more of Examples 1 through 4, wherein the short cladding is divided into multiple longitudinal segments.

Example 6. The voltage drop measurement system of Example 5, wherein a constant current is applied to each of the longitudinal segment and a voltage is measured across each of the longitudinal segments.

Example 7. The voltage drop measurement system of any one or more of Examples 5 through 6, comprising a thermocouple attached to an interior surface of each longitudinal segment.

Example 8. The voltage drop measurement system of any one or more of Examples 5 through 7, wherein the short cladding is divided into four longitudinal segments.

Example 9. A method of measuring local resistivity and calculating heat flux for nuclear cladding tubing, the method comprising: providing a short cladding; attaching electrically conductive plugs to the short cladding; connecting needle like probes to an outer surface of the short cladding, wherein the distance between the needle like probes is L; applying a current (I) to the short cladding through the plugs; measuring a voltage (U) across the needle like probes; rotating the short cladding and repeating processes connecting the needle like probes to the outer surface of the short cladding, applying a new current (I) to the short cladding through the plugs and measuring a new voltage (U) across the needle like probes; determining resistivity of each section based on the voltage measurements; and calculating a local heat flux of the short cladding based on the resistivity measurements.

Example 10. The method of Example 9, further comprising calculating the resistivity according to Equations (1), (2), and (3).

Example 11. The method of any one or more of Examples 9 through 10, further comprising calculating the heat flux according to Equation (4).

Example 12. The method of any one or more of Examples 9 through 11, wherein the short cladding is divided into four quadrants, rotating the short cladding 90° after each resistivity measurement until all four measurements are made.

Example 13. The method of any one or more of Examples 9 through 12, wherein the short cladding is divided into n circumferential sections, rotating the short cladding by 360°/n after each resistivity measurement until all n resistivity measurements are made.

Example 14. A method of measuring local resistivity and calculating heat flux for nuclear cladding tubing, the method comprising: providing a short cladding; segmenting the short cladding into multiple longitudinal segments; attaching electrically conductive plugs to each segment of the short cladding; connecting needle like probes to the desired locations of each segment of the short cladding; applying a constant current (I) across each segment of the short cladding through the plugs; measuring the resulting voltage in each segment; determining resistivity of each segment based on the voltage measurement; and calculating local heat flux of the short cladding based on the resistivity.

Example 15. The method of Example 14, further comprising calculating the resistivity according to Equations (1), (2), and (3).

Example 16. The method of any one or more of Examples 14 through 15, further comprising calculating the heat flux according to Equation (4).

While specific aspects of a system and method for local resistivity measurement and critical heat flux calculation for nuclear cladding tubing have been described in detail, it will be appreciated by those skilled in the art that various modifications and alternatives to those details could be developed in light of the overall teachings of the disclosure and that selected elements of one or more of the example aspects may be combined with one or more elements from other embodiments without varying from the scope of the disclosed concepts. Accordingly, the particular aspects disclosed are meant to be illustrative only and not limiting as to the scope of the disclosed concepts, which is to be given the full breadth of the appended claims and any and all equivalents thereof.

Those skilled in the art will recognize that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to claims containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that typically a disjunctive word and/or phrase presenting two or more alternative terms, whether in the description, claims, or drawings, should be understood to contemplate the possibilities of including one of the terms, either of the terms, or both terms unless context dictates otherwise. For example, the phrase "A or B" will be typically understood to include the possibilities of "A" or "B" or "A and B."

With respect to the appended claims, those skilled in the art will appreciate that recited operations therein may generally be performed in any order. Also, although various operational flow diagrams are presented in a sequence(s), it should be understood that the various operations may be performed in other orders than those which are illustrated, or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to," or other past-tense adjectives are generally not intended to exclude such variants, unless context dictates otherwise.

It is worthy to note that any reference to "one aspect," "an aspect," "an exemplification," "one exemplification," and the like means that a particular feature, structure, or characteristic described in connection with the aspect is included in at least one aspect. Thus, appearances of the phrases "in one aspect," "in an aspect," "in an exemplification," and "in one exemplification" in various places throughout the specification are not necessarily all referring to the same aspect. Furthermore, the particular features, structures or characteristics may be combined in any suitable manner in one or more aspects.

Any patent application, patent, non-patent publication, or other disclosure material referred to in this specification and/or listed in any Application Data Sheet is incorporated by reference herein, to the extent that the incorporated materials is not inconsistent herewith. As such, and to the extent necessary, the disclosure as explicitly set forth herein supersedes any conflicting material incorporated herein by reference. Any material, or portion thereof, that is said to be incorporated by reference herein, but which conflicts with existing definitions, statements, or other disclosure material set forth herein will only be incorporated to the extent that no conflict arises between that incorporated material and the existing disclosure material.

The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system that "comprises," "has," "includes" or "contains" one or more elements possesses those one or more elements, but is not limited to possessing only those one or more elements. Likewise, an element of a system, device, or apparatus that "comprises," "has," "includes" or "contains" one or more features possesses those one or more features, but is not limited to possessing only those one or more features.

In summary, numerous benefits have been described which result from employing the concepts described herein. The foregoing description of the one or more forms has been presented for purposes of illustration and description. It is not intended to be exhaustive or limiting to the precise form disclosed. Modifications or variations are possible in light of the above teachings. The one or more forms were chosen and described in order to illustrate principles and practical application to thereby enable one of ordinary skill in the art to utilize the various forms and with various modifications as are suited to the particular use contemplated. It is intended that the claims submitted herewith define the overall scope.

What is claimed is:

1. A system comprising:
   a portion of a nuclear reactor cladding, wherein the portion of the nuclear reactor cladding has a first end and a second end, wherein the portion of the nuclear reactor cladding is physically divided into multiple segments, wherein each segment of the multiple segments extends between the first end and the second end, wherein each of the multiple segments of the portion of the nuclear reactor cladding comprises an outer surface extending between the first end and the second end;
   two electrically conductive plugs, wherein a first electrically conductive plug of the two electrically conductive plugs is attached to the first end and a second electrically conductive plug of the two electrically conductive plugs is attached to the second end;
   a power supply electrically coupled to each of the two electrically conductive plugs and configured to apply an electrical current to the portion of the nuclear reactor cladding through the two electrically conductive plugs;
   a voltmeter; and
   two needle probes electrically coupled to the outer surface of one of the segments of the multiple segments and to the voltmeter, wherein the two needle probes are spaced apart by a distance L,
   wherein the voltmeter is configured to measure a voltage difference between the two needle probes to calculate a resistivity for the one of the segments of the multiple segments, wherein the needle probes are configured to be coupleable to each of the segments, wherein the voltmeter is configured to measure a voltage difference between the two needle probes to calculate a resistivity for each segment of the multiple segments using the voltage difference.

2. The system of claim 1, comprising a thermocouple attached to an interior surface of at least one of the multiple segments of the portion of the cladding.

3. The system of claim 1, wherein the electrical current is a constant current applied to each of the multiple segments and a voltage is measured across each of the multiple segments.

4. The system of claim 1, comprising a thermocouple attached to an interior surface of each of the multiple segments.

5. The system of claim 1, wherein the multiple segments comprise four segments.

6. A system comprising:
   a portion of a nuclear reactor cladding, wherein the portion of the nuclear reactor cladding has a first end and a second end, wherein the portion of the nuclear reactor cladding is physically divided into four quadrants, wherein each of the quadrants extends between the first end and the second end; wherein each of the quadrants of the portion of the nuclear reactor cladding comprises an outer surface extending between the first end and the second end;

two electrically conductive plugs, wherein a first electrically conductive plug of the two electrically conductive plugs is attached to the first end and a second electrically conductive plug of the two electrically conductive plugs is attached to the second end;

a power supply electrically coupled to each of the two electrically conductive plugs and configured to apply an electrical current to the portion of the nuclear reactor cladding through the two electrically conductive plugs;

a voltmeter; and two needle probes electrically coupled to the outer surface of one of the quadrants and to the voltmeter, wherein the two needle probes are spaced apart by a distance L, wherein the voltmeter is configured to measure a voltage difference between the two needle probes to calculate a resistivity for each of the quadrants using the voltage difference, wherein the needle probes are configured to be coupleable to each of the quadrants.

7. The system of claim 6, comprising a thermocouple attached to an interior surface of at least one of the quadrants of the portion of the cladding of the portion of the cladding.

8. The system of claim 6, wherein the electrical current is a constant current applied to each of the quadrants and a voltage is measured across each of the quadrants.

9. The system of claim 6, comprising a thermocouple attached to an interior surface of each of the quadrants.

10. A system comprising:

a portion of a nuclear reactor cladding, wherein the portion of the nuclear reactor cladding has a first end and a second end, wherein the portion of the nuclear reactor cladding is physically divided into multiple segments, wherein each segment of the multiple segments extends between the first end and the second end, wherein each of the multiple segments of the portion of the nuclear reactor cladding comprises an outer surface extending between the first end and the second end;

two electrically conductive plugs, wherein one a first electrically conductive plug of the two electrically conductive plugs is attached to the first end and a second electrically conductive plug of the two electrically conductive plugs is attached to the second end;

a power supply electrically coupled to each of the two electrically conductive plugs and configured to apply an electrical current to the portion of the nuclear reactor cladding through the two electrically conductive plugs;

a voltmeter; and two needle probes electrically coupled to the outer surface of one of the segments of the multiple segments and the voltmeter, wherein the two needle probes are spaced apart by a distance L.

11. The system of claim 10, wherein the electrical current is a constant current applied to each of the multiple segments and the voltmeter is configured to measure a voltage across each of the multiple segments.

12. The system of claim 10, comprising a thermocouple attached to an interior surface of each of the multiple segments.

13. The system of claim 10, wherein the multiple segments comprise four longitudinal segments of the portion of the nuclear reactor cladding.

14. The system of claim 10, comprising a thermocouple attached to an interior surface of at least one of the multiple segments of the portion of the cladding.

\* \* \* \* \*